(12) United States Patent
Shimura

(10) Patent No.: US 6,441,515 B1
(45) Date of Patent: Aug. 27, 2002

(54) LINEAR MOTOR

(75) Inventor: Yoshiki Shimura, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 09/657,204

(22) Filed: Sep. 7, 2000

(30) Foreign Application Priority Data

Sep. 10, 1999 (JP) ............................................ 11-257630
Sep. 13, 1999 (JP) ............................................ 11-259220

(51) Int. Cl.[7] .............................................. H02K 41/02
(52) U.S. Cl. ....................................................... 310/12
(58) Field of Search ................................. 310/12, 13, 14

(56) References Cited

U.S. PATENT DOCUMENTS 5,536,983 A * 7/1996 Araki et al. ................... 310/12
5,598,043 A * 1/1997 Hirano et al. .................. 310/12

* cited by examiner

Primary Examiner—Nestor Ramirez
Assistant Examiner—Judson H. Jones
(74) Attorney, Agent, or Firm—Hogan & Hartson, LLP

(57) ABSTRACT

A linear motor includes a frame linearly extending in a longitudinal direction and having a channel-shaped cross section. The frame has sidewalls and a bottom wall that define a channel. A core is disposed on each of the side walls of the frame. An armature-side block is disposed in the channel of the frame. The armature-side block has a plurality of armatures, each of the armatures having two end surfaces at positions opposing to the cores provided on the side walls of the frame. One linear guide is disposed between the frame and the armature-side block. The linear guide has a rail fixed to the bottom wall of the frame and a slide block fixed to the armature-side block, such that one of the frame and the armature-side block is linearly movable relative to the other. A linear encoder having a linear scale and a sensor spaced a distance from the linear scale are disposed within the channel of the frame.

24 Claims, 9 Drawing Sheets

LINEAR MOTOR

BACKGROUND OF THE INVENTION

1. Field of the Invention

The present invention relates to linear motors. More particularly, the present invention relates to linear motors that are suitable to be used for FA (factory automation).

2. Description of Related Art

A typical conventional linear motor has a mover 101 and a stator 102. Two linear guides 103 are mounted on the stator 102, and the mover 101 is mounted in a manner moveable along the stator 102, as shown in FIG. 16. A magnetic circuit is provided to generate a thrusting force to the mover 101. A surface 104 of the magnetic circuit opposing to the mover 101 is disposed between the two linear guides 103. In other words, the magnetic circuit has a single opposing surface 104, which is formed between the two linear guides. Also a variety of sensors 105 such as linear encoders and the like are disposed to detect the position of the mover 101. The sensors 105 are mounted on an exterior side surface of the linear motor or other exterior surfaces outside the linear motor.

However, in the linear motor described above, the opposing surface 104 of the magnetic circuit is formed between the two linear guides 103. As a result, a magnetic attraction force generated between the stator 102 and the mover 101 acts as a force that deforms the stator 102 and the mover 101, as shown by a two-dot and dash line shown in FIG. 16. Accordingly, the stator 102 and the mover 101 may need to be thicker or reinforced to secure a greater rigidity. This is an obstacle to designing a smaller and lighter linear motor. Also, since the magnetic circuit has a single opposing surface 104, it is difficult to obtain a high thrusting force.

Moreover, the various sensors 105 are mounted on an exterior side surface of the linear motor or other exterior surfaces outside the linear motor. As a result, plates that mounts the stator 102 and the mover 101 are bent by the magnetic attraction force described above, and therefore the gap distance in the various sensors 105 may substantially change. As a result, the position detection with a high precision becomes difficult, and dust and particles more likely affect the sensors. Moreover, the sensors become more vulnerable to mechanical external disturbances. For example, the sensors may likely contact objects that may come close to a moving path of the sensors.

SUMMARY OF THE INVENTION

It is an object of the present invention to provide a linear motor that increases the number of opposing surfaces of a magnetic circuit, and protects various sensors from mechanical external disturbances.

In accordance with one embodiment of the present invention, a linear motor has a linear guide and an armature-side block that are disposed inside a frame that linearly extends in its longitudinal direction, and opposing surfaces of a magnetic circuit can be formed at two locations that interpose the armature-side block. As a result, surfaces (opposing surfaces of a magnetic circuit) that generate a thrusting force of the linear motor are formed at two locations.

In accordance with one embodiment of the present invention, a linear guide and an armature-side block are disposed within a channel-shaped frame, and a linear encoder can be provided on or adjacent the linear guide. Accordingly, variations in the gap between the linear scale and the position detection sensor are difficult to take place when the linear motor is driven. In other words, the gap management is easy. Also, the linear encoder can be disposed in an area that is difficult to receive influences of leak magnetic fluxes of the main body of the linear motor, and thus a high accurate position detection can be conducted.

In accordance with one embodiment of the present invention, two linear guides are disposed on a frame and an armature-side block is mounted over the two linear guides. As a result, relative movements between the frame and the armature-side block are stabilized.

Other features and advantages of the invention will be apparent from the following detailed description, taken in conjunction with the accompanying drawings that illustrate, by way of example, various features of embodiments of the invention.

DESCRIPTION OF PREFERRED EMBODIMENTS

Figure 1:
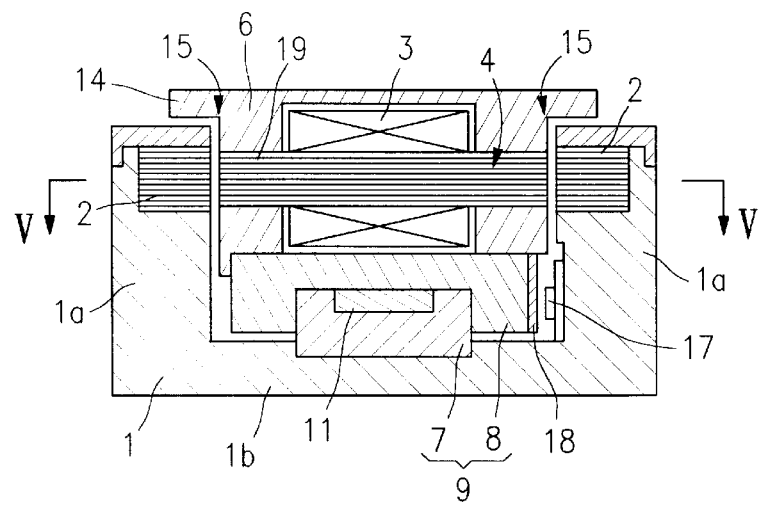
FIG. 1 is a cross-sectional view of a linear motor in accordance with a first embodiment of the present invention taken along lines I—I of FIG. 2.
Figure 2:
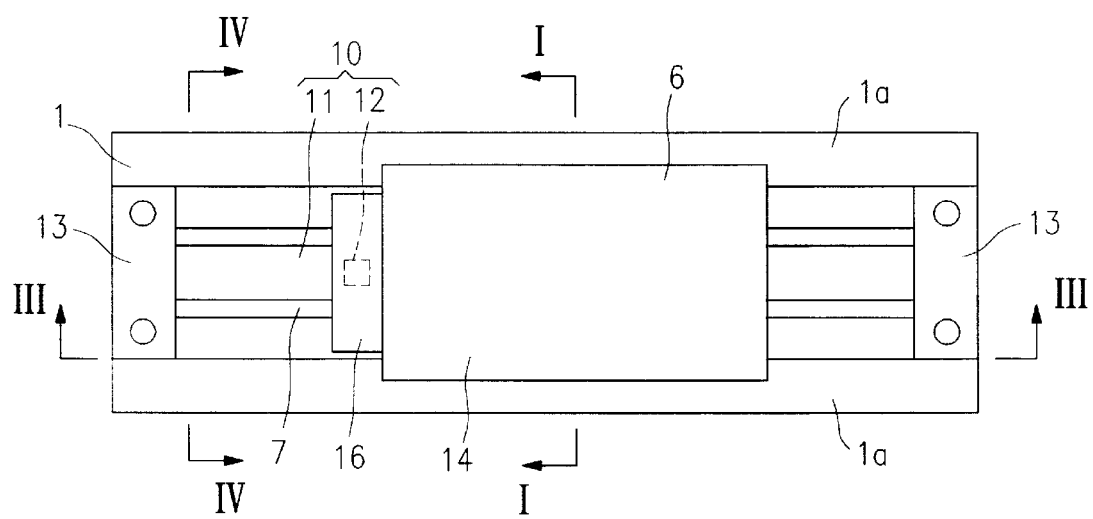
FIG. 2 is a plan view of the linear motor of the first embodiment.
Figure 3:
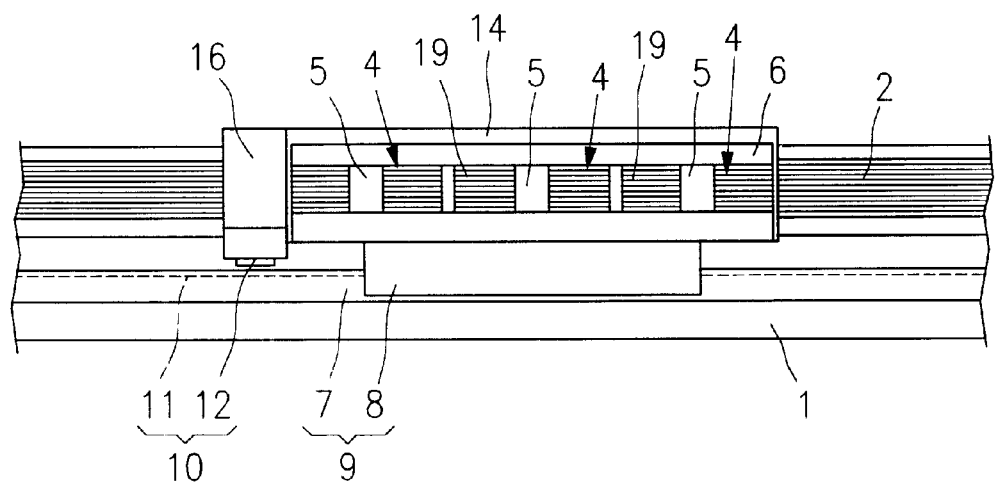
FIG. 3 is a cross-sectional view of the linear motor taken along lines III—III of FIG. 2.
Figure 4:
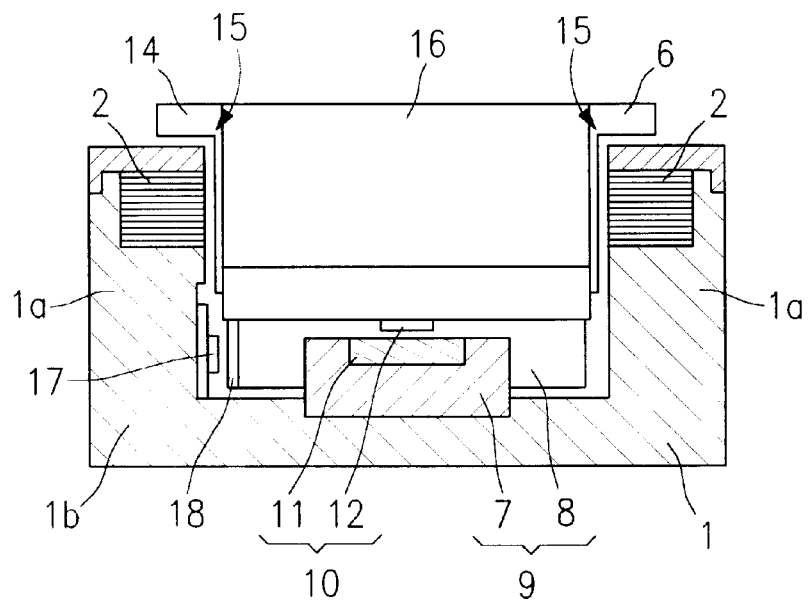
FIG. 4 is a cross-sectional view of the linear motor taken along lines IV—IV of FIG. 2.
Figure 5:
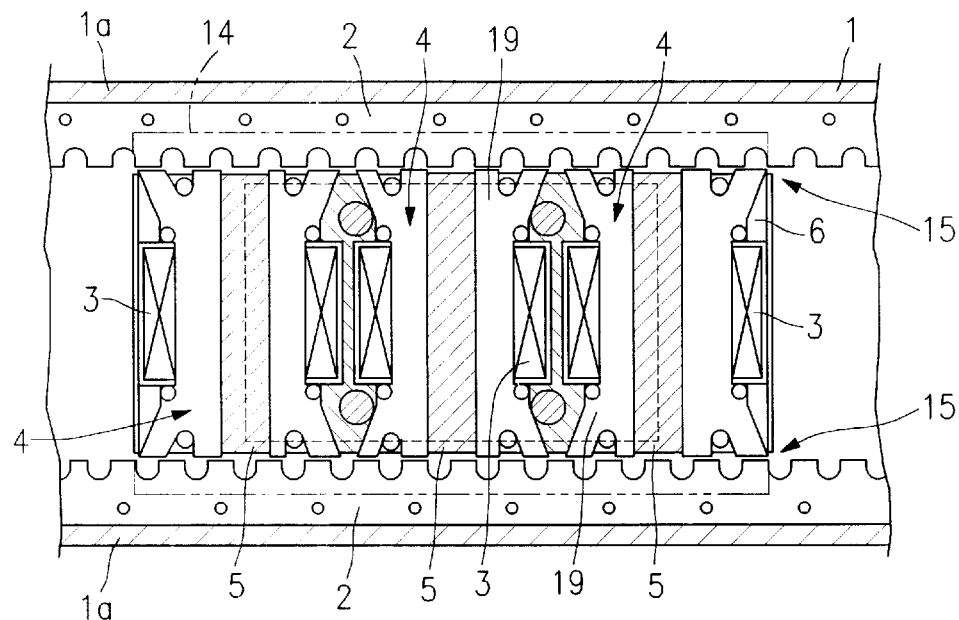
FIG. 5 is a cross-sectional view of the linear motor taken along lines V—V of FIG. 1.

A linear motor in accordance with a first embodiment of the present invention is described below with reference to the accompanying drawings.

FIGS. 1 through 5 show a linear motor in accordance with the first embodiment of the present invention. The linear motor includes a frame 1 linearly extending in a longitudinal direction thereof. In accordance with one embodiment of the present invention, the frame 1 has a hollow channel section that has, for example, a channel-shaped cross section. The frame 1 has two walls 1a extending in a vertical direction. The linear motor includes cores 2 disposed on the two walls 1a, and armatures 4 disposed opposite to the cores 2. An armature-side block 6 having the armatures 4 and magnets 5 integrally mounted on the armature-side block 6 is disposed on the inside of the channel-shaped frame 1. A linear guide 9 is disposed between the frame 1 and the armature-side block 6. The linear guide 9 may be formed from a rail 7 and a slide block 8. The rail 7 of the linear guide 9 is fixed to the frame 1, and the slide block 8 of the linear guide 9 is fixed to the armature-side block 6, such that one of the frame 1 and the armature-side block 6 can be linearly moved with respect to the other. A linear encoder 10 having a linear scale 11 is provided in a manner that the linear scale 11 is fixed to the rail 7. A sensor 12 is disposed on the slide block 8 in a manner that the sensor 12 is disposed opposite to the linear scale 11 and spaced a distance from the linear scale 11.

The armature-side block 6 includes cores 19 disposed opposite to the cores 2 that are provided on the frame 1, coils 3 respectively disposed around the cores 19, and magnets 5 interposed between the cores 19. As shown in FIG. 1, the cores 19 of the armature-side block 6 extend in a direction generally perpendicular to the walls 1a, such that end faces of the cores 19 oppose to the coils 2 provided on the frame 1. In this embodiment, three cores 19 are provided on the armature-side block 6. However, cores in a different number than three, can be provided on the armature-side block 6. The rail 7 of the linear guide 9 is fixed to a bottom plate 1b of the frame 1.

In accordance with the first embodiment of the present invention, the armature-side block 6 functions as a mover and the frame 1 functions as a stator, such that the armature-side block 6 can linearly move with respect to the frame 1. However, in accordance with another embodiment, the relationship between the stator and the mover may be inverted, such that the armature-side block 6 functions as a stator and the frame 1 functions as a mover.

The frame 1 functioning as a stator has side plates 13 disposed on both sides of the frame 1 in its longitudinal direction. The linear guide 9 is disposed between the side plates 13. An upper surface of the armature-side block 6 is provided with a table 14.

In accordance with the first embodiment of the present invention, the armature-side block 6 is disposed inside the channel-shaped frame 1, and the cores 2 are disposed in the two walls 1a of the channel-shaped frame 1. As a result, opposing surfaces 15 of the magnetic circuit are formed in a manner that the armature-side block 6 are interposed between the opposing surfaces 15.

The linear scale 11 may be formed by, for example, a magnetic type linear scale, and is embedded in the rail 7 of the linear guide 9. A sensor device, such as, for example, a magnetic sensor 12 is disposed opposite to the linear scale 11 with a predetermined gap provided between the magnetic sensor 12 and the linear scale 11. In other word, the magnetic sensor 12 and the linear scale 11 are disposed on the interior of the channel-shaped frame 1. In another embodiment of the present invention, for example, a magnetic reluctance element may be used as the magnetic sensor 12. It is noted that the magnetic sensor 12 is not limited to the magnetic reluctance element. Portions of the linear scale 11 are magnetized at specified intervals, preferably at equal intervals. The magnetic sensor 12 counts the magnetized portions to detect locations of the armature-side block 6. In accordance with the first embodiment, the magnetic sensor 12 is mounted on a bottom surface of a block 16 that is fixed to one end surface of the armature-side block 6, such that the magnetic sensor 12 is mounted on the slide block 8.

Figure 6:
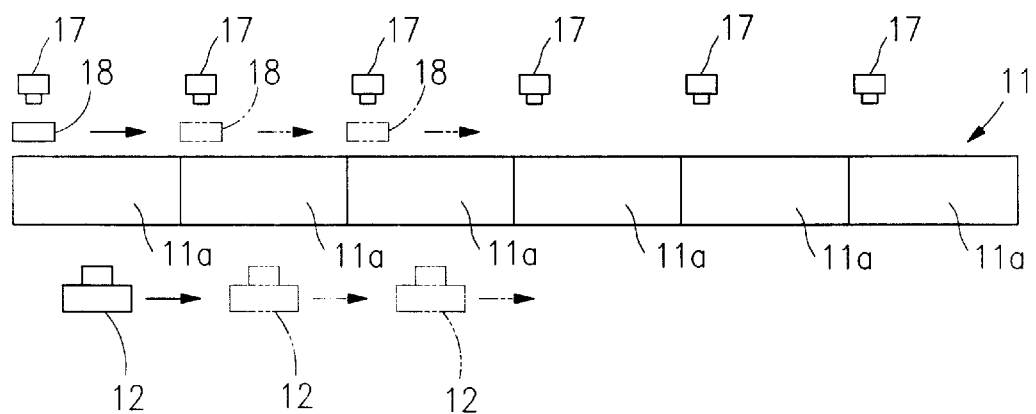
FIG. 6 is a schematic illustration to show relations of a linear scale and position detection sensors.

Moreover, the linear scale 11 may be of a vernier type, for example, and position detection sensors 17 are provided at intervals of the length of a vernier to detect positions of the armature-side block 6. FIG. 6 is a schematic illustration to show relations between the linear scale 11 and the position detection sensors 17. A sensor reflection plate 18 is fixed to a side surface of the slide block 8, and a plurality of the position detection sensors 17 are disposed on the frame 1 at positions opposite to the sensor reflection plate 18. In accordance with this embodiment, the sensor reflection plate 18 and the position detection sensors 17 are disposed on the inside of the channel-shaped frame 1. The position detection sensors 17 may be reflection-type photoelectric sensors, for example, and are disposed at the corresponding verniers 11a of the linear scale 11, respectively.

The sensor reflection plate 18 and the magnetic sensor 12 move together with the armature-side block 6. Accordingly, it can be determined by the position detection sensors 17 and the sensor reflection plate 18 which one of the verniers 11a corresponds to positional information that is detected by the magnetic sensor 12. It is noted that a vernier type linear scale may be employed as the linear scale 11 of the linear encoder 10 to achieve a higher resolution in the linear encoder 10.

As a current is flown through the coils of the armatures 4, a thrusting force is generated between the opposing surfaces 15 of the magnetic circuit, in other words, between the cores 2 and the armatures 4. As a result, the armature-side block 6 moves along the linear guide 9 relative to the frame 1. The opposing surfaces 15 of the magnetic circuit that generate the thrusting force are formed at two locations that interpose the armature-side block 6. As a result, magnetic attraction forces generated in the opposing surfaces 15 of the magnetic circuit are offset one another. As a consequence, the frame 1 can be provided with a necessary rigidity without substantially increasing the thickness of the frame 1, and therefore, the linear motor can be made smaller and lighter. Also, deforms of the frame 1 and other parts by the magnetic attraction forces can be prevented, and thus variations in the gap between the linear scale 11 and the magnetic sensor 12 can be prevented. As a result, the detection accuracy is improved. Also, since the opposing surfaces 15 of the magnetic circuit are provided at two locations, the linear motor in accordance with the present invention provides a limit thrusting force that is approximately two times greater than the conventional linear motor that has only one opposing surface.

Positions of the armature-side block 6 are detected by the linear scale 11, the magnetic sensor 12, the position detection sensors17 and the sensor reflection plate 18, which are disposed on the inside of the frame 1, in other words, within the channel of the frame 1. This structure substantially protects the devices inside the frame 11 from external influences that may come from the outside of the linear motor. Also, since the linear scale 11 is mounted on the linear guide 9 in a manner that the linear scale 11 is positioned generally at a center of thrusting force of the linear motor, variations in the gap between the linear scale 11 and the magnetic sensor 12 can be suppressed when the linear motor is driven. In other words, the gap management is easy. In addition, the linear scale 11 and the magnetic sensor 12 can be disposed at locations that are difficult to receive leak magnetic fluxes of the main body of the linear motor. As a consequence, highly accurate position detection can be performed.

Figure 7:
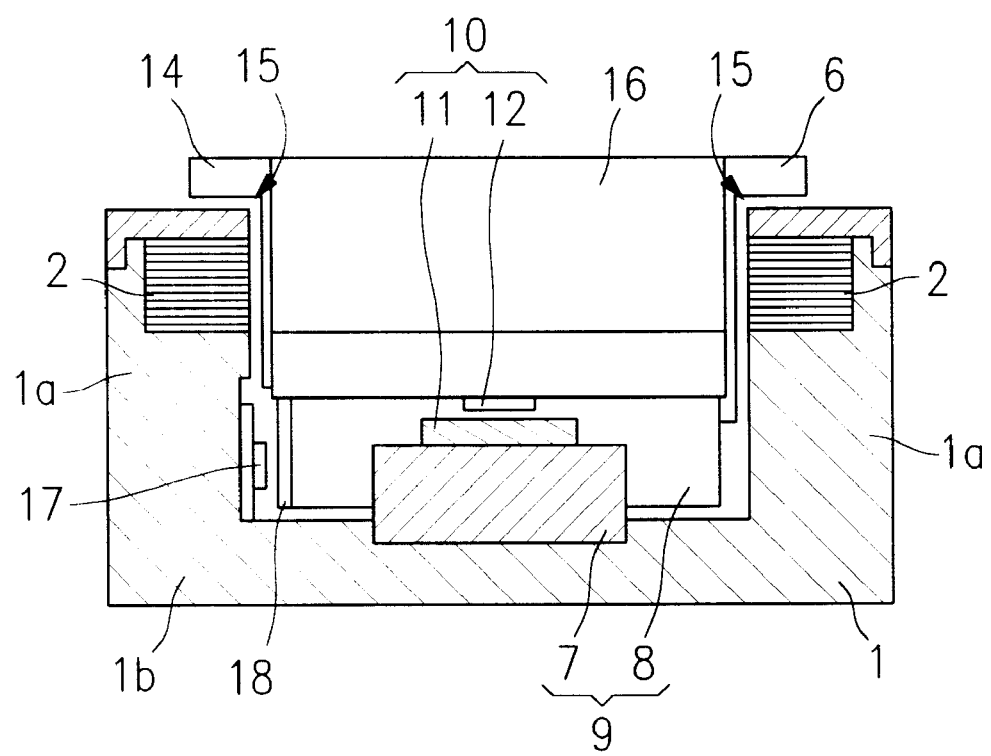
FIG. 7 is a cross-sectional view of a modification example of the linear motor of the first embodiment, in which the cross-sectional view is taken in a similar manner as FIG. 4.
Figure 8:
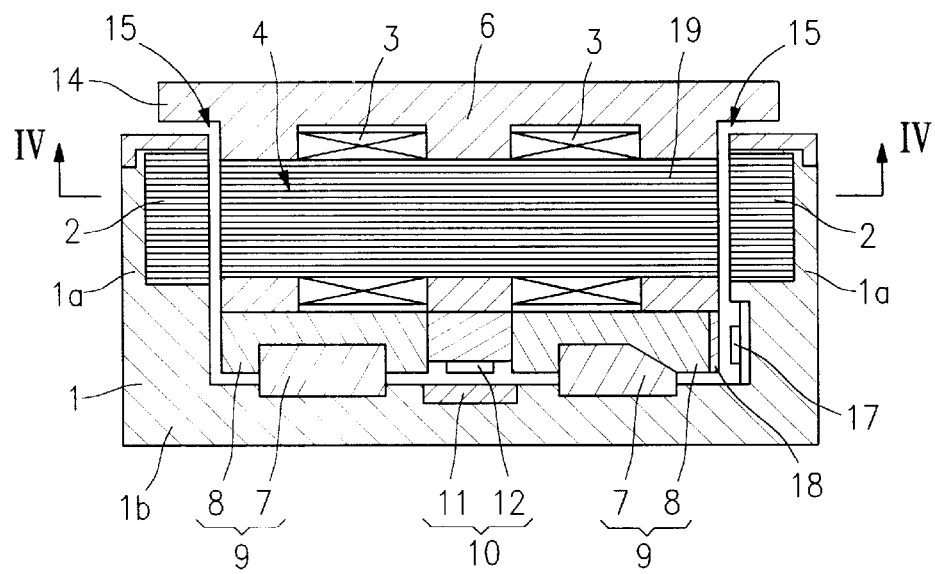
FIG. 8 is a cross-sectional view of a linear motor in accordance with a second embodiment of the present invention taken along lines I—I of FIG. 9.
Figure 9:
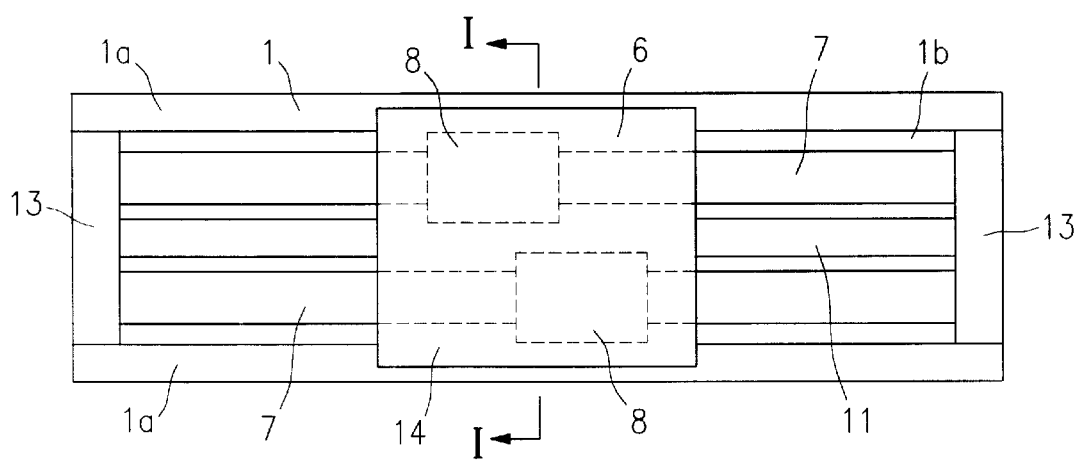
FIG. 9 is a plan view of the linear motor of the second embodiment.
Figure 10:
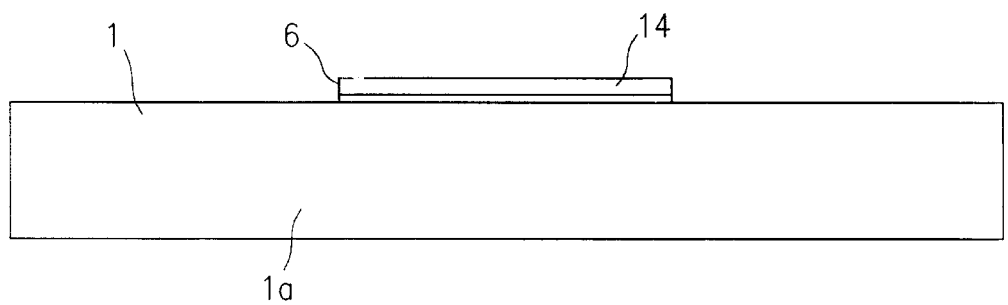
FIG. 10 is a side view of the linear motor of the second embodiment.
Figure 11:
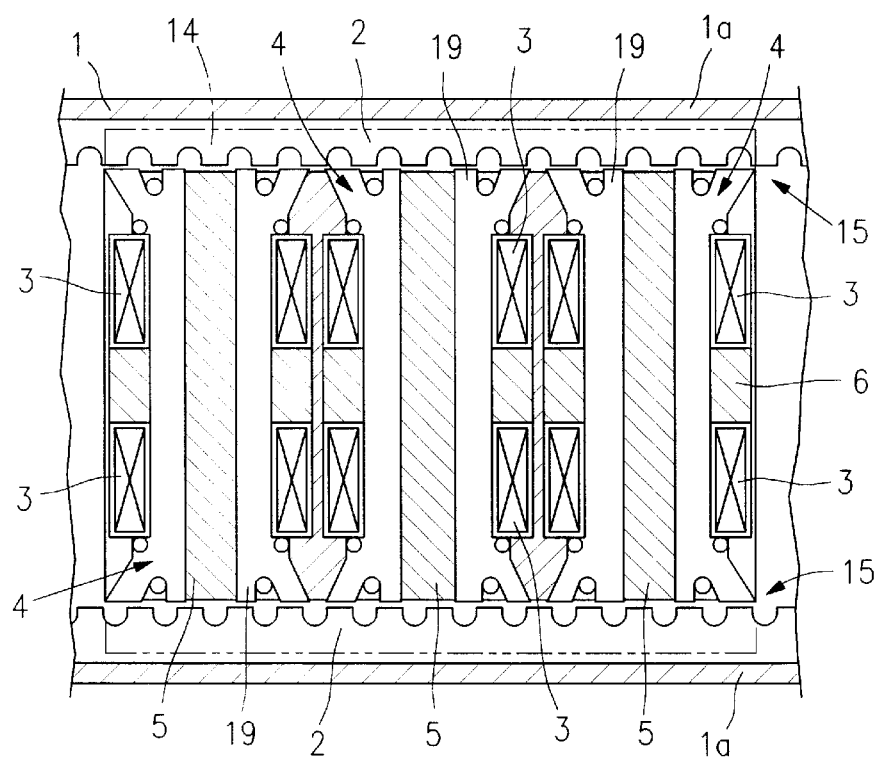
FIG. 11 is a cross-sectional view of the linear motor taken along lines IV—IV of FIG. 8.
Figure 12:
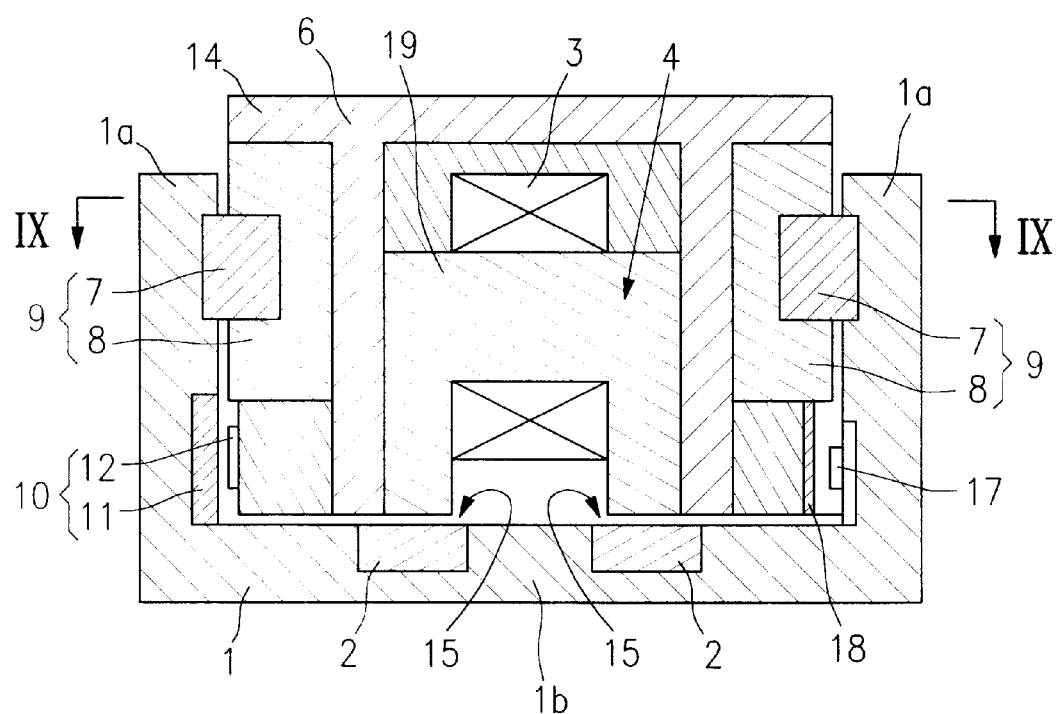
FIG. 12 is a cross-sectional view of a modification example of the linear motor of the second embodiment taken along lines VI—VI of FIG. 13.
Figure 13:
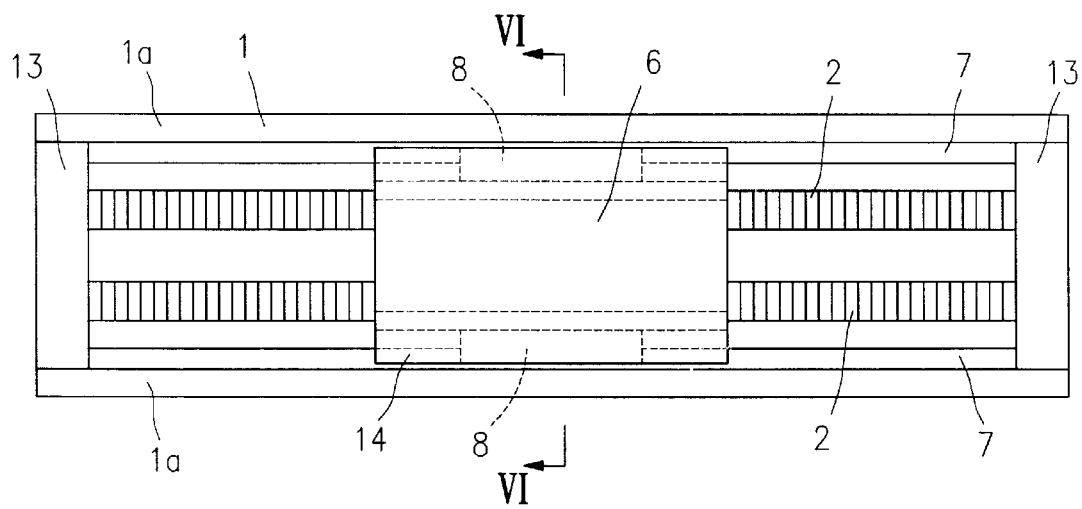
FIG. 13 is a plan view of the linear motor shown in FIG. 12.
Figure 14:
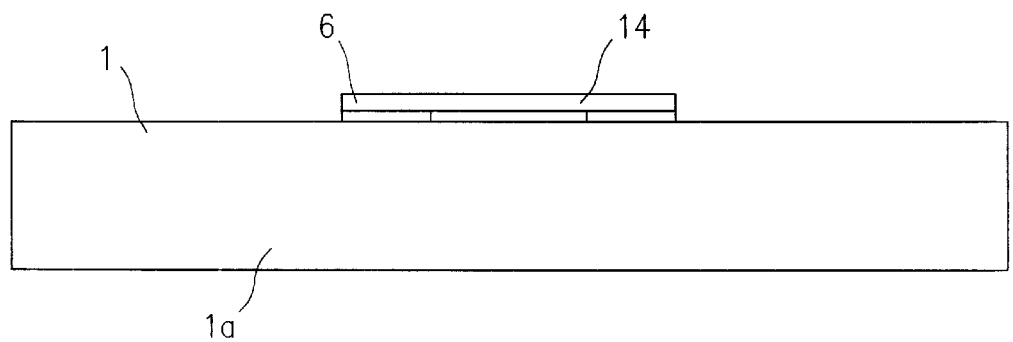
FIG. 14 is a side view of the linear motor shown in FIG. 12.
Figure 15:
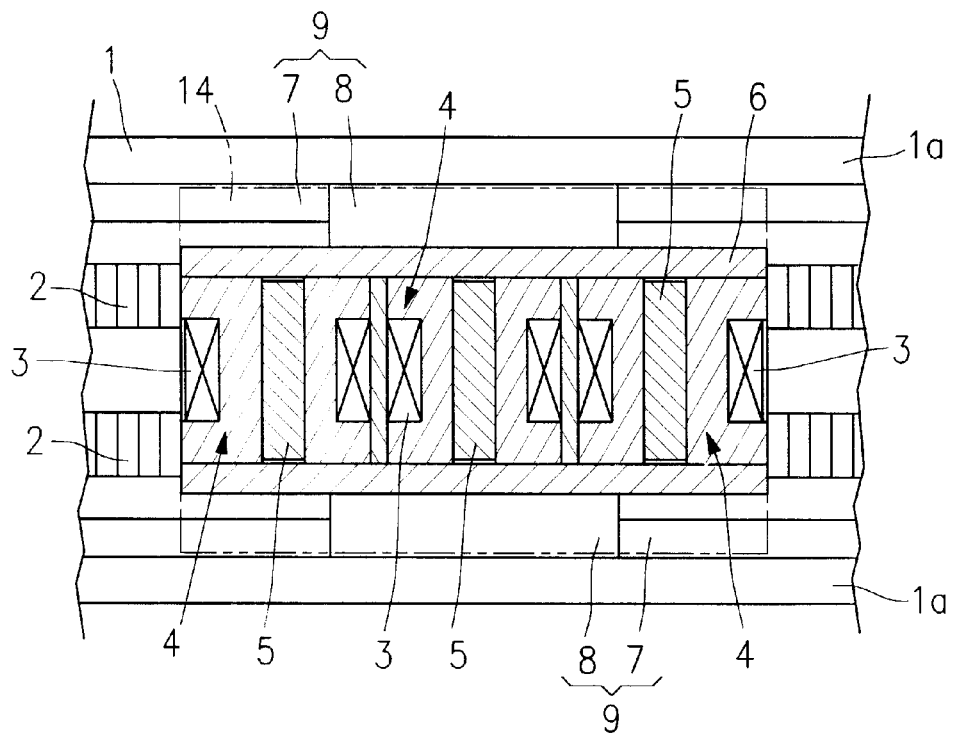
FIG. 15 is a cross-sectional view taken along lines IX—IX of FIG. 12.
Figure 16:
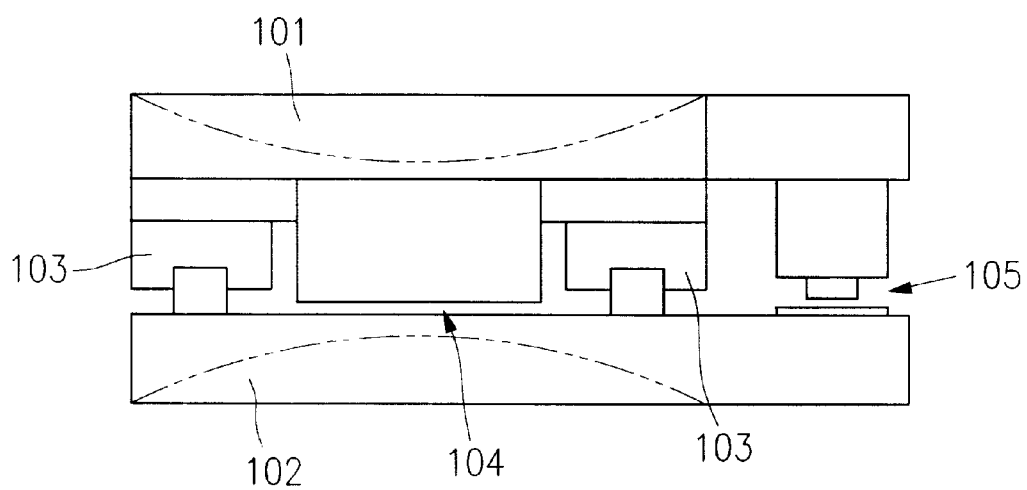
FIG. 16 is a schematic illustration of a conventional linear motor.

The first embodiment described above is one of preferred embodiments of the present invention, and the present invention is not limited to the embodiment described above. A variety of modifications can be made within the scope of the subject matter of the present invention. For example, in the embodiment described above, the linear scale 11 of the linear encoder 10 is embedded in the rail 7 of the linear guide 9. However, the linear scale 11 may be adhered to the surface of the rail 7, as shown in FIG. 7.

A linear motor in accordance with a second embodiment of the present invention is described with reference to the accompanying drawings. It is noted that structural elements of the second embodiment that are the same as those of the first embodiment are indicated by the same reference numbers.

FIGS. 8 through 11 show a linear motor in accordance with the second embodiment of the present invention. The linear motor includes a frame 1 linearly extending in a longitudinal direction thereof and has a channel-shaped cross section, cores 2 disposed on the frame 1, and an armature-side block 6 that has armatures 4. The armatures 4 are disposed opposite to the cores 2. Two linear guides 9 are disposed between the frame 1 and the armature-side block 6. In accordance with the second embodiment, the two linear guides 9 are generally symmetrically disposed about the center of the width of the channel of the frame 1. However, one of the two linear guides 9 may be disposed closer to the center of the width of the channel of the frame 1 than the other. The linear guides 9 may include two rails 7 that are fixed to the frame 1 and two slide blocks 8 that are fixed to the armature-side block 6 and engage the rails 7, in a manner that one of the frame 1 and the armature-side block 6 is linearly movable relative to the other. A linear encoder 10 having a linear scale 11 is provided in a manner that the linear scale 11 is fixed to the frame 1. A sensor 12 is disposed on the slide block 8 in a manner that the sensor 12 is disposed opposite to the linear scale 11 and spaced a distance from the linear scale 11.

The armature-side block 6 includes cores 19 disposed opposite to the cores 2 that are provided on the frame 1, and coils 3 wound around the cores 19, respectively. The two rails 7 of the linear guides 9 are fixed to a bottom plate 1b of the frame 1. The cores 19 of the armature-side block 6 extend in a direction generally perpendicular to the side walls 1a of the frame 1, such that end faces of the cores 19 are disposed opposite to the cores 2 that are embedded in the side walls 1a of the frame.

The linear scale 11 may be formed by, for example, a magnetic type linear scale, and is disposed between the two linear guides 9. A sensor such as a magnetic sensor 12 is disposed opposite to the linear scale 11 with a predetermined gap provided between the magnetic sensor 12 and the linear scale 11. In other word, the magnetic sensor 12 and the linear scale 11 are disposed on the interior of the channel-shaped frame 1.

In the second embodiment, the armature-side block 6 functions as a mover, and the two linear guides 9 guide the movement of the armature-side block 6. Accordingly, the right side and the left side of the armature-side block 6 in its width direction are more balanced compared to an armature-side block that is guided by a single linear guide. As a result, more stabilized movements of the armature-side block 6 are obtained even when the center of gravity of an object to be moved is offset either to the right side or to the left side.

In the embodiment described above, the cores 2 are disposed on two side walls 1a of the frame 1 and the two linear guides 9 are disposed on the bottom plate 1b of the frame 1. However, as shown in FIGS. 12–15, the linear guides 9 may be disposed on the two side walls 1a of the frame 1, and the cores 2 may be disposed on the bottom plate 1b of the frame 1. It is noted that the elements shown in FIGS. 12–15 that are the same as those of the linear motor shown in FIGS. 6–11 are indicated by the same reference numbers.

In the linear motor shown in FIGS. 12–15, the linear encoder 10 is provided between one of the side walls 1a of the frame 1 and an armature-side block 6, and the position detection sensors 17 and the sensor reflection plate 18 are disposed between the other wall 1a of the frame 1 and the armature-side block 6. The frame 1 of the liner motor shown in FIGS. 12–15 also has a channel-shaped cross section (i.e., u-shaped cross section) and the two linear guides 9 and the armature-side block 6 are disposed on the inside of the channel-shaped frame 1, in a similar manner as those of the linear motor shown in FIGS. 6–11. As a result, the linear scale 11, the magnetic sensors 12, the position detection sensor 17 and the sensor reflection plate 18 are disposed on the inside of the frame 1. As a result, similar effects as those described above are obtained. Namely, the structure of substantially protects the elements inside the linear motor from external influences. Variations in the gap between the linear scale 11 and the magnetic sensor 12 are suppressed when the linear motor is driven. Opposing surfaces 15 of the magnetic circuit that generate a thrusting force are formed at two locations, and the armature-side block 6 becomes more balanced as the armature-side block 6 is guided by the two linear guides 9.

The embodiment described above is one of preferred embodiments of the present invention, and the present invention is not limited to the embodiment described above. A variety of modifications can be made within the scope of the subject matter of the present invention.

For example, in the embodiment described above, a magnetic type encoder is used as the encoder 10. However, an optical type linear encoder or the like may also be used.

Also, a reflection type photoelectric sensor is used as the position detection sensor 17. However, a transmission type photoelectric sensor or a magnetic type proximity sensor may also be used.

Furthermore, a chuck, a jig, an arm or the like may be mounted on the armature-side block 6. In this case, the side plates 13 may be removed from the frame 1 in order to avoid interference with the chuck, the jig or the arm. If the side plates 13 are removed, a space above the rail 7 or the linear guide 1 or the table 17 can be used for placing an object to be moved such as a work piece.

As described above, in a linear motor in accordance with the present invention, a linear guide and an armature-side block can be disposed on the inside of a channel-shaped frame that linearly extends in its longitudinal direction, and opposing surfaces of a magnetic circuit can be formed at two locations that interpose the armature-side block. As a result, surfaces (opposing surfaces of a magnetic circuit) that generate a thrusting force of the linear motor are formed at two locations. This structure provides a limit thrusting force that is approximately twice as large as a linear motor having a single opposing surface of a magnetic circuit. Furthermore, since a magnetic circuit and a linear encoder can be enclosed within the channel of the channel-shaped frame, the magnetic circuit and the linear encoder are protected from mechanical external disturbances.

Also, since the linear guide and the armature-side block are disposed within the frame, a linear encoder can be provided on or adjacent the linear guide. Accordingly, variations in the gap between the linear scale and the sensor are difficult to take place when the linear motor is driven, in other words, the gap management is easy. Also, the linear encoder can be disposed in an area that is difficult to receive influences of leak magnetic fluxes of the main body of the linear motor, and thus highly accurate position detection can be conducted.

Furthermore, since two linear guides are symmetrically disposed in the linear motor, relative movements between the frame and the armature-side block are stabilized.

In the linear motor in accordance with the embodiments of the present invention described above, the armature-side block functions as a mover and the frame functions as a stator, and the mover is capable of linearly moving relative to the frame. As a result, the frame may be installed in a manufacturing line in a factory, so that the armature-side block can be moved along the linear guide from a specified location to another specified location.

In the linear motor in accordance with the embodiments of the present invention, the linear scale is a magnetic type linear scale that is disposed opposite to magnetic sensors. As a result, relative positions of the armature-side side block and the frame can be magnetically detected. Furthermore, a magnetic reluctance element can be used for the magnetic sensor. A wide range of magnetic reluctance elements has been widely used and thus a large amount of technical resources for the magnetic reluctance elements are available. Such magnetic reluctance elements can be used to improve the durability and reliability of the linear encoder.

Also, in the linear motor in accordance with the present invention, a sensor reflection plate is affixed to a side surface of a slide block, and a plurality of position detection sensors are disposed on the frame at location opposite to the sensor reflection plate. As a result, a vernier type linear encoder can be employed, which results in highly accurate position detection. Furthermore, a reflection type photoelectric sensor can be used for the position detection sensor. A wide range of reflection type photoelectric sensors has been widely used and thus a large amount of technical resources for the reflection type photoelectric sensors are available. Such reflection type photoelectric sensors can be used to improve the durability and reliability of the position detection sensor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A linear motor comprising:
   a frame linearly extending in a longitudinal direction and having a channel-shaped cross section;
   at least one core disposed inside the frame;
   an armature-side block disposed inside the frame, the armature-side block having at least one armature and at least one magnet integrally provided thereon, the armature disposed opposite to the core;
   a linear guide having a rail fixed to the frame and a slide block fixed to the armature-side block, such that the frame and the armature-side block are linearly movable relative to one another;
   a linear encoder having a linear scale, wherein the linear scale is fixed to one of the rail and the frame; and
   a sensor spaced a distance from and opposing to the linear scale, the sensor disposed on the slide block.

2. A linear motor according to claim 1, wherein the armature-side block is a mover, and the frame is a stator, wherein the armature-side block is linearly movable with respect to the frame.

3. A linear motor according to claim 1, wherein the linear scale is a magnetic-type linear scale, and the sensor is a magnetic sensor disposed in a manner that the magnetic sensor opposes to the magnetic-type linear scale.

4. A linear motor according to claim 3, wherein the magnetic sensor uses a magnetic reluctance element.

5. A linear motor according to claim 1, wherein a sensor reflector plate is fixed on the slide block, and a plurality of position detector sensors are disposed on the frame at locations opposing to the sensor reflector plate.

6. A linear motor according to claim 5, wherein the position detector sensors are formed from reflection type photoelectric sensors.

7. A linear motor according to claim 1, wherein the rail of the linear guide includes two rails symmetrically disposed about a center of a channel of the frame, and the slide block includes two slide blocks that are fixed to the armature-side block and engage the two rails, respectively.

8. A linear motor according to claim 7, wherein the armature-side block is a mover, and the frame is a stator, wherein the armature-side block is linearly movable with respect to the frame.

9. A linear motor according to claim 7, wherein the linear scale is a magnetic-type linear scale, and the sensor is a magnetic sensor disposed in a manner that the magnetic sensor opposes to the magnetic-type linear scale.

10. A linear motor according to claim 9, wherein the magnetic sensor uses a magnetic reluctance element.

11. A linear motor according to claim 7, wherein a sensor reflector plate is fixed on the slide block, and a plurality of position detector sensors are disposed on the frame at locations opposing to the sensor reflector plate.

12. A linear motor according to claim 11, wherein the position detector sensors are formed from reflection type photoelectric sensors.

13. A linear motor comprising:
   a frame linearly extending in a longitudinal direction and having a channel-shaped cross section, the frame having sidewalls and a bottom wall that define a channel;
   a core disposed on each of the side walls of the frame;
   an armature-side block disposed in the channel of the frame, the armature-side block having a plurality of armatures, each of the armatures having two end surfaces at positions opposite to the cores provided on the side walls of the frame;
   at least one linear guide having a rail fixed to the bottom wall of the frame and a slide block fixed to the armature-side block, such that the frame and the armature-side block are linearly movable relative to one another; and
   a linear encoder having a linear scale and a sensor spaced a distance from the linear scale, wherein the linear scale and the sensor are disposed within the channel of the frame.

14. A linear motor according to claim 13, wherein the linear scale of the linear encoder is fixed on one of the rail and the frame, and the sensor is disposed on the slide block.

15. A linear motor according to claim 14, wherein the linear scale of the linear encoder is embedded in one of the rail and the frame.

16. A linear motor according to claim 13, wherein each of the armatures has a core that extends in a direction generally perpendicular to the side walls of the frame, the core of each of the armatures having end surfaces at positions opposite to the cores provided on the side walls of the frame.

17. A linear motor according to claim 13, further comprising a sensor reflector plate fixed on the slide block and a plurality of position detector sensors disposed on the frame at locations opposite to the sensor reflector plate, wherein the sensor reflector plate and the plurality of position detector sensors are disposed in the channel of the frame.

18. A linear motor according to claim 13, wherein the rail of the linear guide includes two rails symmetrically disposed about a center of a width of the channel of the frame and fixed on the bottom wall of the frame, and the slide block includes two slide blocks that are fixed to the armature-side block and engage the two rails, respectively.

19. A method for manufacturing a linear motor, the method comprising:
   providing a frame linearly extending in a longitudinal direction with sidewalls and a bottom to define a channel-shaped cross section;
   disposing a core on each of the side walls of the frame;
   disposing an armature-side block in the channel of the frame, the armature-side block having a plurality of armatures;
   positioning two end surfaces of each of the armatures adjacent to the cores provided on the side walls of the frame;
   affixing at least one linear guide having a rail to the bottom wall of the frame and a slide block to the armature-side block, such that the frame and the armature side block are linearly movable relative to one another; and
   disposing a linear encoder having a linear scale and a sensor spaced a distance from the linear scale within the channel of the frame.

20. A method for manufacturing a linear motor according to claim 19, further comprising affixing the linear scale of the linear encoder on one of the rail and the frame, and the sensor on the slide block.

21. A method for manufacturing a linear motor according to claim 19, wherein the linear scale of the linear encoder is embedded in one of the rail and the frame.

22. A method for manufacturing a linear motor according to claim 19, further comprising disposing a core of each of the armatures to extend in a direction generally perpendicular to the side walls of the frame, the core of each of the armatures having end surfaces at positions opposing to the cores provided on the side walls of the frame.

23. A method for manufacturing a linear motor according to claim 19, further comprising affixing a sensor reflector plate on the slide block and a plurality of position detector sensors on the frame at locations opposing to the sensor reflector plate, wherein the sensor reflector plate and the plurality of position detector sensors are disposed in the channel of the frame.

24. A method for manufacturing a linear motor according to claim 19, further comprising providing the linear guide with two rails and two slide blocks, symmetrically disposing the two rails of the linear guide about a center of a width of the channel of the frame, and affixing the two slide blocks of the linear guide to the armature-side block in a manner to engage the two rails, respectively.

* * * * *